(12) United States Patent
Vippach et al.

(10) Patent No.: US 11,846,337 B2
(45) Date of Patent: Dec. 19, 2023

(54) DAMPING ELEMENT WITH THREAD PORTION

(71) Applicant: NIDEC GPM GMBH, Merbelsrod (DE)

(72) Inventors: Michael Vippach, Nahetal-Waldau (DE); Maik Büttner, Lautertal (DE)

(73) Assignee: NIDEC GPM GMBH, Merbelsrod (DE)

( * ) Notice: Subject to any disclaimer, the term of this patent is extended or adjusted under 35 U.S.C. 154(b) by 0 days.

(21) Appl. No.: 17/267,984

(22) PCT Filed: Aug. 16, 2019

(86) PCT No.: PCT/EP2019/072037
§ 371 (c)(1),
(2) Date: Feb. 11, 2021

(87) PCT Pub. No.: WO2020/035602
PCT Pub. Date: Feb. 20, 2020

(65) Prior Publication Data
US 2021/0324932 A1    Oct. 21, 2021

(30) Foreign Application Priority Data
Aug. 17, 2018    (DE) .................... 10 2018 120 113.3

(51) Int. Cl.
*F16F 1/373*    (2006.01)
*F16F 1/376*    (2006.01)
*F16F 1/377*    (2006.01)

(52) U.S. Cl.
CPC ............ *F16F 1/3732* (2013.01); *F16F 1/376* (2013.01); *F16F 1/377* (2013.01); *F16F 2238/04* (2013.01)

(58) Field of Classification Search
CPC .......... F16F 1/3732; F16F 1/376; F16F 1/377; F16F 2238/04
See application file for complete search history.

(56) References Cited

U.S. PATENT DOCUMENTS

| | | | |
|---|---|---|---|
| 556,215 | A | 3/1896 | Schmidt |
| 2,437,843 | A | 3/1948 | Van Ness |

(Continued)

FOREIGN PATENT DOCUMENTS

| | | |
|---|---|---|
| CN | 203023383 U | 12/2012 |
| CN | 203023383 U | 6/2013 |

(Continued)

*Primary Examiner* — Melody M Burch
(74) *Attorney, Agent, or Firm* — WC&F IP

(57) ABSTRACT

A damping element (1) has a multi-start thread on its circumferential surface (4). The damping element (1) can engage in a recess in a first body (12). To this end, the damping element (1) has a thread portion on its circumferential surface and the recess (13) in the first body (12) has in its inner lateral surface at least one mating thread portion which corresponds to the thread portion of the damping element (1). Through engagement of the thread in the mating thread, the damping element can be screwed together with the first body (12). By means of the thread, the damping element (1) can be fastened to the first body (12) and separated therefrom again with little effort. A fastening element (23) can fasten the damping element (1) to a second body in order to fasten the first (12) and the second bodies to one another in a vibration-damped manner.

12 Claims, 5 Drawing Sheets

(56) References Cited

U.S. PATENT DOCUMENTS

| | | | |
|---|---|---|---|
| 2,996,311 A * | 8/1961 | Thiry | B60G 7/00 |
| | | | 280/124.144 |
| 4,430,776 A | 2/1984 | Shimizu et al. | |
| 4,653,968 A | 3/1987 | Rapata et al. | |
| 5,110,081 A * | 5/1992 | Lang, Jr. | F16F 3/0873 |
| | | | 267/293 |
| 6,267,347 B1 | 7/2001 | Ryan | |
| 2017/0044773 A1 | 2/2017 | Gernhart | |

FOREIGN PATENT DOCUMENTS

| | | |
|---|---|---|
| DE | 201 02 258 U1 | 11/2001 |
| DE | 100 48 889 A1 | 4/2002 |
| DE | 10 2008 057 883 A1 | 5/2010 |
| DE | 10 2011 081 469 A1 | 2/2013 |
| FR | 2797208 A1 * | 2/2001 |
| GB | 222 618 A | 7/1990 |
| KR | 1193248 B1 * | 10/2012 |
| WO | 8801026 A1 | 2/1988 |
| WO | WO-2008028678 A1 * | 3/2008 |
| WO | WO-2012095020 A1 * | 7/2012 |
| WO | 2016/134410 A1 | 9/2016 |
| WO | 2018/000017 A1 | 1/2018 |

* cited by examiner

DAMPING ELEMENT WITH THREAD PORTION

FIELD OF THE INVENTION

The invention relates to a damping element. The invention further relates to a combination comprising a damping element and a first body, wherein the damping element can in particular engage in a recess in the first body. The invention additionally relates to a device for vibration-damped fastening of a first body to a second body, wherein the device has a damping element.

BACKGROUND OF THE INVENTION

DE 10048889 A1 discloses a hollow-cylindrical damping element for fastening a body to a plate using a screw. To this end, the damping element is arranged in a bush-type housing. The connection between damping element and housing is produced by complementary shaping of damping element and housing.

DE 102008057883 A1 discloses a rubber buffer for mounting an engine hood on a vehicle body component. The rubber buffer has a main body in the form of a cylindrical element with a helical groove. With the assistance of the helical groove, which acts as a screw thread, the rubber buffer can be screwed into the inner panel of the bonnet.

U.S. Pat. No. 4,430,776 describes a rubber buffer for connecting two panels. The rubber buffer has various protrusions, and resilient projections which, for the purpose of mobility, are separated from the rest of the material of the rubber buffer on two of their four sides by an L-shaped cut-out.

DE 102011081469 A1 discloses a unit fastening device for vibratory securing of an engine or transmission to a running gear. A first bearing part on the engine side and a second bearing part on the running gear side are connected together therein by a vibration-damping element which is secured in the second bearing part by a bearing cover. The bearing cover is connected to the second bearing part by a thread or by a bayonet closure.

Problem Addressed by the Invention

The problem addressed by the invention is that of providing an improved damping element. The problem addressed by the invention is moreover that of providing an improved combination comprising a damping element and a first body, wherein the damping element can in particular engage in a recess in the first body. The problem addressed by the invention is furthermore that of providing an improved device for vibration-damped fastening of a first body to a second body.

Solution According to the Invention

The stated problem is solved by a damping element having a multi-start thread on its circumferential surface.

To describe the position and geometry of the damping element, two opposing sides of the damping element are designated "end faces" and the preferably closed surface connecting these two sides is designated "circumferential surface". The circumferential surface is preferably a cylindrical, and particularly preferably circular cylindrical, surface. The "longitudinal direction" of the damping element is the direction of an axis which runs through the centroids of the two end faces.

A "multi-start thread" is a thread which has two or more parallel thread helices, so distinguishing it from a conventional, single-start thread. The multi-start nature of the thread means that the damping element can be readily and rapidly screwed into the recess in the first body, because on insertion only a comparatively short turning motion has to be performed, generally less than a whole turn.

A thread comprises one or more thread portions. Consequently, a thread portion is a thread or part of a thread. The thread portion may in particular be one of several thread portions of a thread of the damping element. The thread portion may for example be formed by a groove, a ridge or a combination of a groove and a ridge. The thread portion does not necessarily have to extend over a full thread revolution, but may also extend over just part of a full thread revolution.

The problem of the invention is furthermore solved by a combination comprising a damping element and a first body, wherein the damping element can engage in a recess in the first body. The damping element has a thread portion on its circumferential surface and the recess in the first body has at least one mating thread portion in its inner lateral surface. The mating thread portion corresponds to the threaded portion of the damping element, such that, through engagement of the thread in the mating thread, the damping element can be screwed together with the first body.

The statements in the preceding paragraph regarding the thread portion also apply, mutatis mutandis, to the mating thread portion. A mating thread portion may be a mating thread or part of a mating thread. In particular, the mating thread portion may be one of a plurality of mating thread portions of a mating thread of the first body. This may also for example be formed by a groove, a ridge or a combination of a groove and a ridge. The mating thread portion does not necessarily have to extend over a full mating thread revolution, but may also extend over just part of a full mating thread revolution.

The stated problem is moreover solved by a device which may fasten a first body to a second body in vibration-damped manner by means of the damping element.

The first body may for example be a pump, for example a vacuum, oil or coolant pump, for example a cooling water pump, in particular the housing of such a pump, for an engine, in particular an internal combustion engine. The second body may be the engine itself, in particular the engine block thereof. The pump unit may also be adapted to other components, the solution thus not being limited to connection to an internal combustion engine.

PREFERRED EMBODIMENTS OF THE INVENTION

Advantageous developments and further developments, which may be used individually or in combination, constitute the subject matter of the dependent claims and the following description.

The preferred damping element comprises, particularly preferably consists of, a rubber-elastic material, preferably an elastomer, for example hydrogenated acrylonitrile butadiene rubber (HNBR) or ethylene propylene diene rubbers (EPDM).

The preferred damping element and/or the preferred first body has, on its circumferential surface, at least two, preferably three or four, thread portions or mating thread portions, which are typically spaced from one another. The thread portions or mating thread portions preferably have identical lead angles and particularly preferably the thread portions or mating thread portions are of identical configuration.

In one embodiment of the invention, two of the thread portions or mating thread portions form different thread helices or parts of different thread helices of a multi-start thread. Alternatively or in addition, one or more pairs of adjacent thread portions or mating thread portions may be aligned with regard to their longitudinal direction in such a way that they form portions of the same thread helix or mating thread helix.

The preferred damping element has, on its circumferential surface, a multi-start thread, for example a two-start, three-start, four-start, five-start, six-start, seven-start, eight-start or more than eight-start thread. The thread preferably has fewer than 40 starts and particularly preferably fewer than 20 starts. The invention however also comprises embodiments in which the damping element has just one single-start thread on its circumferential surface.

Similarly, the preferred first body is provided on the inner lateral surface of its recess with a multi-start mating thread, for example with a two-start, three-start, four-start, five-start, six-start, seven-start, eight-start or more than eight-start mating thread. The mating thread preferably has fewer than 40 starts and particularly preferably fewer than 20 starts. The invention however also comprises embodiments in which the first body has just one single-start mating thread on the inner lateral surface of its recess.

The thread portions and/or the mating thread portions are preferably spaced uniformly from one another on the circumferential surface of the damping element or in the interior lateral surface of the recess. The thread portions or mating thread portions are particularly preferably arranged rotationally symmetrically, and particularly preferably n-fold rotationally symmetrically, relative to the longitudinal axis of the damping element or of the first body, wherein the number of thread portions or mating thread portions is divisible by n. In other embodiments, the damping element has just one thread portion.

The "longitudinal direction" of the first body is the direction in which the damping element can be inserted into the recess in the first body. The longitudinal direction of the first body preferably runs perpendicular to the end face of the first body. The preferred recess is a substantially cylindrical, and particularly preferably circular cylindrical, hole. A through-hole is particularly preferred.

In one preferred embodiment of the combination according to the invention, the damping element can be secured to the first body by screwing by a turn, relative to the first body, of less than 720°, particularly preferably less than 360°, particularly preferably less than 180°, particularly preferably less than 90° and particularly preferably less than 45°. This is achievable in particular by a suitable number of thread helices. One achievable advantage of this embodiment of the invention is that the combination can be readily joined together and separated.

In embodiments with more than one thread, preferably at least one, particularly preferably all, thread portion(s) extend(s) over less than 800°, particularly preferably less than 400°, particularly preferably less than 200°, particularly preferably less than 100° and particularly preferably less than 50°. Statements of angle are always related to a full 360° turn or circle. Similarly, in the case of more than one mating thread portion, preferably at least one, particularly preferably all, mating thread portion(s) extend(s) over less than 800°, particularly preferably less than 400°, particularly preferably less than 200°, particularly preferably less than 100° and particularly preferably less than 50°.

The preferred thread and/or mating thread has a length of two leads or fewer, particularly preferably one lead or less, particularly preferably half a lead or less and particularly preferably a quarter lead or less.

The thread portion(s) and/or mating thread portion(s) preferably has/have a lead angle of more than 0.5°, particularly preferably more than 1°, particularly preferably more than 2°, particularly preferably more than 4° and particularly preferably more than 8°. In this way, it is advantageously achievable that even a small turn can bring about sufficient relative motion in the longitudinal direction to secure the damping element reliably to the first body.

The thread portion(s) and/or mating thread portion(s) preferably has/have a lead angle of less than 60°, particularly preferably less than 45°, particularly preferably less than 30°, particularly preferably less than 20° and particularly preferably less than 10°. In this way, it is advantageously possible to prevent the damping element from being too easily re-detachable from the first body due to an excessively large thread lead.

The preferred damping element has a latching element and the preferred first body has a mating latching element, which can interact with the latching element of the damping element in order to lock the damping element to the first body in the state in which it is screwed to the first body. In this case, the latching element and/or the mating latching element is preferably a projection, a cut-out or a narrow point of the damping element or of the first body. The preferred latching element is resilient. It is preferably made from the same material as the damping element and particularly preferably in one piece with the latter. The latching element and/or the mating latching element is arranged for example on a thread portion or mating thread portion of the damping element or of the first body.

A preferred damping element has a handling portion. In the handling portion, at least one or a plurality of depression (s), projection(s) or through-hole(s) are preferably arranged on the circumferential face of the damping element, preferably spaced uniformly in the circumferential direction in the case of a plurality. The preferred handling portion projects beyond the recess in the first body, when the damping element is fastened in the recess. This enables a fitter to grasp the handling portion with their hand or with a tool, in order to rotate the damping element about its longitudinal direction relative to the first body. As a result of this rotation, the projection can be moved beyond the narrow point in order to secure the damping element to the first body or detach it therefrom.

The damping element is preferably annular. "Annular" means that the damping element has a hole which extends from the first end face through the damping element to the second end face. The preferred hole is at least in places cylindrical and particularly preferably circular cylindrical. At least in places, the preferred damping element is a hollow cylinder, and particularly preferably a circular hollow cylinder.

A bush is preferably arranged in the hole in the damping element. The bush is preferably of metal, for example steel, and particularly preferably of sheet steel, or of plastics. The preferred bush spans more than the half of the longitudinal extent of the hole, i.e. the distance from the one end to the other hand end of the hole, particularly preferably spanning at least 70% and particularly preferably at least 90% of the hole. However, it preferably does not span the entire hole. The advantage of this is that the damping element can be compressed in its longitudinal direction without the bush thereby exiting the damping element at an end face.

The circumferential surface of the bush preferably adjoins in places or in full the circumferential surface of the hole in the damping element. Damping element and bush are preferably connected interlockingly together. In this way, it may be ensured that the bush is secured in the damping element, in order to prevent the bush from slipping out of the damping element. In one embodiment of the invention, the hole in the damping element to this end has at least two portions with different hole diameters. The preferred bush has at least two corresponding portions of different external diameters, wherein a portion of the bush of smaller external diameter adjoins a portion of the hole of smaller hole diameter and a portion of the bush of larger external diameter adjoins a portion of the hole in the damping element of greater hole diameter. The bush preferably has a radially outwardly extending protrusion at one end face of the damping element, which protrusion particularly preferably adjoins the end face of the damping element. This protrusion may contribute to securing the bush and the damping element together in interlocked manner. In some embodiments of the invention, the damping element with inserted bush is vulcanized or the damping element is adhesively bonded to the bush.

The preferred device for vibration-damped fastening of a first body to a second body has a fastening element in addition to the damping element. The preferred fastening element can engage in the hole in the damping element and in a recess in the second body in order to connect them. The bush is preferably arranged between the fastening element and the damping element.

The preferred second body has a recess into which the fastening element engages at least in places. The preferred recess is a substantially cylindrical, and particularly preferably circular cylindrical, hole. The hole may be a blind hole, i.e. a hole closed at one end, or a through-hole. The recesses in the first body and the second body are preferably coaxially aligned or at least overlap one another.

In one preferred embodiment of the invention, the fastening element spans the hole in the damping element, i.e. it extends through the entire longitudinal extent of the hole from one end face of the damping element to the other end face of the damping element. The fastening element is preferably arranged captively in the bush. The preferred bush has a constriction on the inside thereof, particularly preferably at one end of the bush. The fastening element preferably has two portions in each case with a diameter which is of such a size that it cannot overcome the constriction of the bush, wherein these portions of the screw are arranged at opposing sides of the constriction of the bush. One portion of enlarged diameter is preferably formed by a head of the fastening element. A second portion of enlarged diameter is preferably located in the region of a shank of the fastening portion and is hereinafter designated "securing portion". The constriction of the bush is preferably located at the end of the bush facing the head of the fastening element.

The preferred fastening element has a head with a chin. The diameter of the chin is preferably greater than the diameter of the hole in the damping element, such that the head of the fastening element cannot enter the hole. In this way, the damping element or the combination of the damping element and the bush can advantageously be secured between the chin and the end face of the second body. The preferred chin has a diameter of such a size that it can act on the second end face of the damping element in order to compress the damping element.

The preferred fastening element is a screw. A screw for the purposes of the present invention has a head and a shank, wherein the shank has a thread at least in places and particularly preferably at least at the end at which the head is not located. The thread of the fastening device is preferably located at the end of the securing portion remote from the head.

The recess in the second body is preferably provided with a mating thread corresponding to the thread of the fastening element, such that the device can be fastened by screws to the second body.

BRIEF DESCRIPTION OF THE DRAWINGS

Further advantageous configurations are described in greater detail below with reference to multiple exemplary embodiments illustrated schematically in the drawings, to which the invention is however not limited and in which.

DETAILED DESCRIPTION OF ONE EMBODIMENT OF THE INVENTION

In the description given below of a preferred embodiment of the present invention, the same reference signs denote the same or comparable components.

Figure 1A:
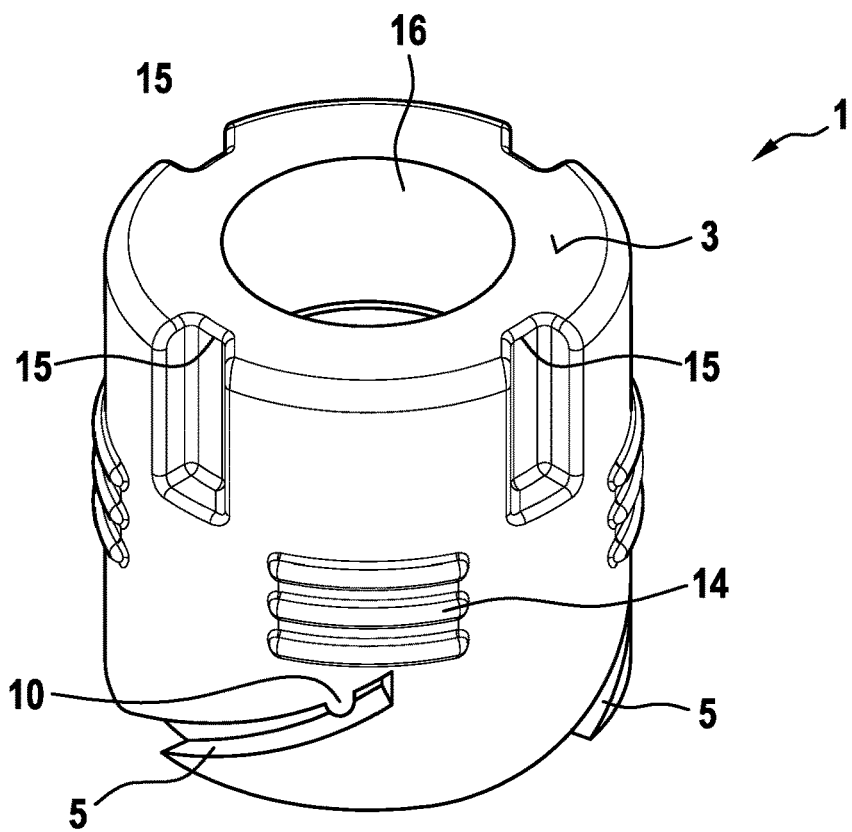
FIG. 1 shows a damping element according to the invention in (a) perspective view and (b) cross-sectional view.
Figure 1B:
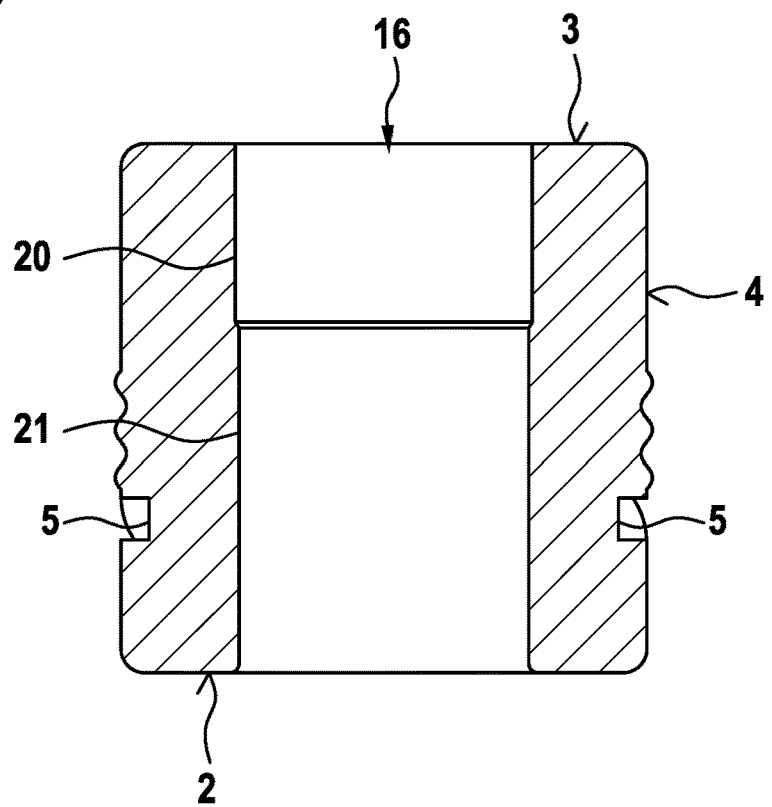
Figure 5A:
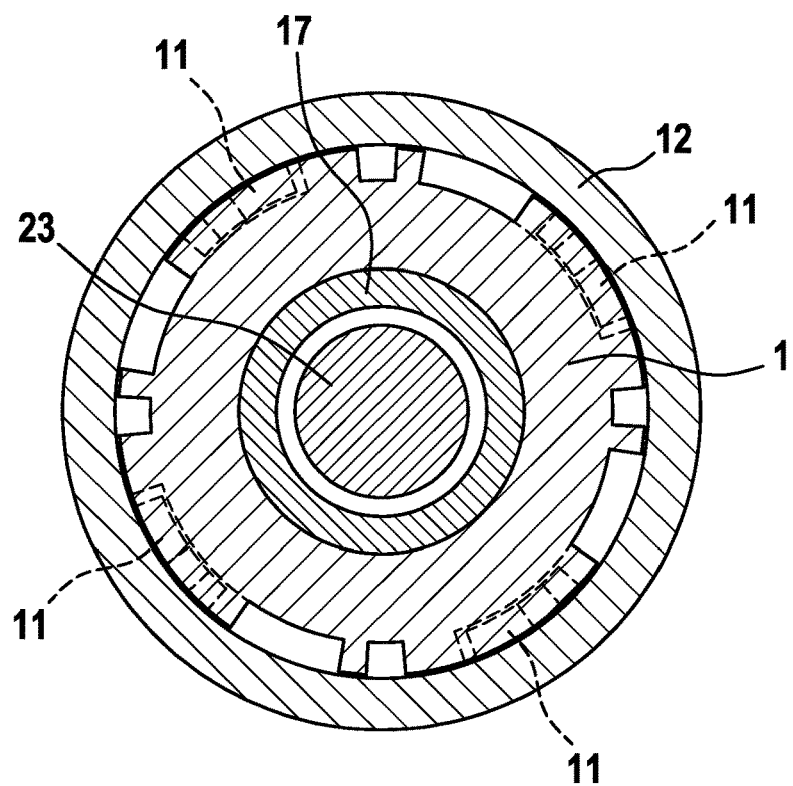
FIG. 5 is a cross-sectional view of the device of FIGS. 2 and 3 with damping element inserted into the first body in (a) unlocked and (b) locked position.
Figure 5B:
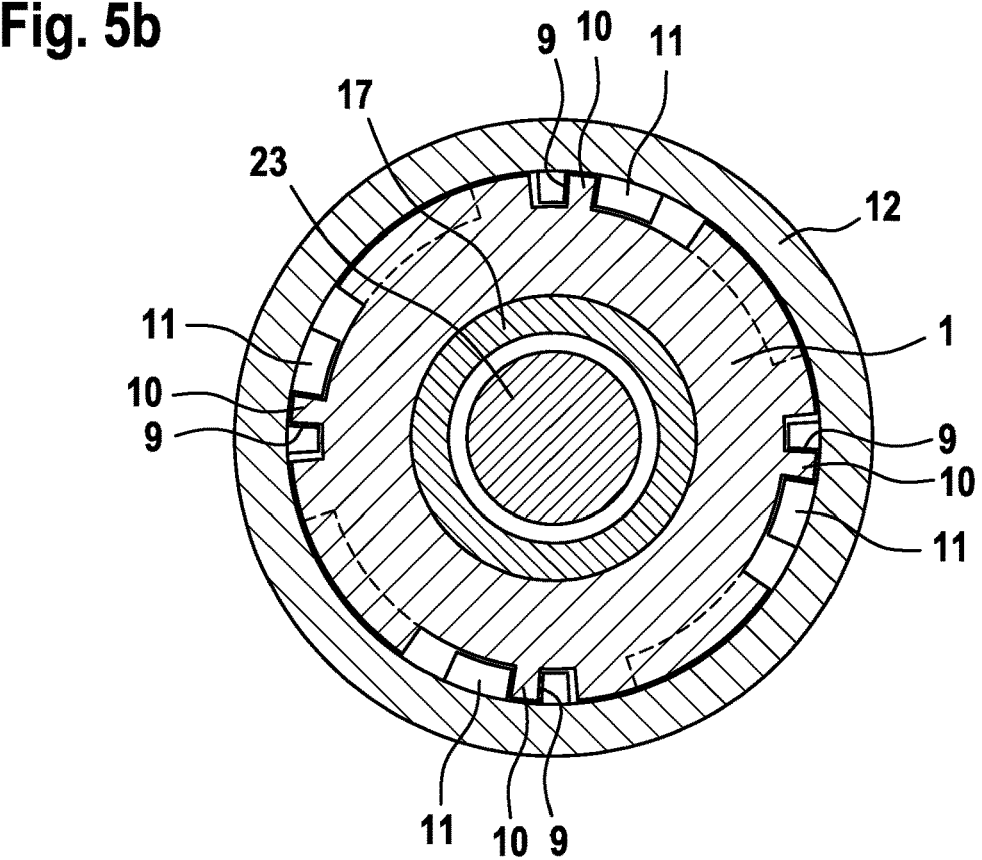

A damping element 1 according to the invention has, as may best be seen in FIGS. 1a and 1b, an annular, to be precise hollow-cylindrical, shape, wherein the first 2 and the second 3 end faces are connected by a circumferential surface 4 of the damping element 1. In the circumferential surface 4 there is located a four-start thread with four thread portions 5, formed as grooves, which are open at the end directed towards the first end face 2 and closed towards the second end. The thread portions are identical to one another and, as is readily visible in FIGS. 5a and 5b, spaced uniformly from one another. Each thread portion has a latching element 10 in the form of a projection in the vicinity of its second end. The projection is made of the same material as and in one piece with the damping element 1.

The first body has a four-start mating thread with four mating thread portions 11 in the form of ridges on the inner lateral surface of a cut-out 13 in the first body. Each of the mating thread portions 11 has a mating latching element 9 in the form of a depression in the vicinity of its end. Latching element 10 and mating latching element 9 work together to secure the damping element 1 screwed together with the first body 12 to the first body 12 in such a way that the screw connection can no longer become readily undone. To ensure that the latching element 10 can engage in the mating latching element 9, the latching element has to yield resiliently in order to enter the depression in the mating latching element.

To fasten the damping element 1 in the recess 13 in the first body 12, it is firstly inserted in the longitudinal direction into the recess 13, wherein the thread portions 5 of the damping element are screwed together with the mating thread portions 11 of the first body 12. If the mating thread portions then come into contact with the latching element 10, the resilient force of the latching element has to be overcome by the application of increased force during screwing, so that the latching element 10 can engage in the cut-out in the mating latching element 9 in order to lock the damping element together with the first body. An increased force has likewise to be applied against the resilient force of the latching element 10 in order to separate latching element 10 and mating latching element 9 again and so undo the locking connection. Damping element 1 and first body 12 can then be separated from one another again by a reversed screwing movement.

Moreover, the damping element 1 has circumferentially extending ribs 14 which pretension the damping element resiliently against the inner surface of the cut-out 13 in the first body 12 and thus ensure, jointly with thread and mating thread, that the damping element 1 sits firmly in the recess 13 in the first body 12. The recess 13 in the first body 12 is a circular cylindrical through-hole. The first body 12 is a coolant pump and in the figures is shown symbolically as a ring about its recess 13 solely for the purpose of simplification.

The damping element has a handling portion with four uniformly spaced depressions 15 on the circumferential face of the damping element. In another exemplary embodiment not shown in the figures, the handling element has just one depression. The handling portion projects, as is readily apparent in FIGS. 2a, 2b, 3a and 3b, beyond the recess 13 in the first body 12 even when the damping element 1 has been secured in the recess 13. In this way, a fitter can grasp the handling portion with their hand or with a tool in order to rotate the damping element 1 about its longitudinal direction relative to the first body 12 and in this way fasten it to the first body 12 or detach it therefrom.

A hole 16 in the damping element 1 extends from the first 2 to the second end face 3 of the damping element 1. In the hole 16 is arranged a bush 17 which spans the hole from the first end face 2 to shortly before the second end face 3. In this way, the damping element 1, as is easily visible in FIG. 3b, may be compressed in its longitudinal direction, without the bush 17 thereby exiting from the damping element 1 at an end face 2, 3, in particular the second end face 3. To secure the bush 17 in the damping element 1, it has an upper portion 18 with a somewhat larger external diameter than that of a lower portion 19, and the hole 16 in the damping element has a corresponding upper portion 20 with a somewhat larger internal diameter than that of a lower portion 21. Moreover, at the first end face 2 of the damping element 1, the bush 17 has a radially outwardly extending protrusion 22, which adjoins the first end face 2 of the damping element 1.

Figure 2A:
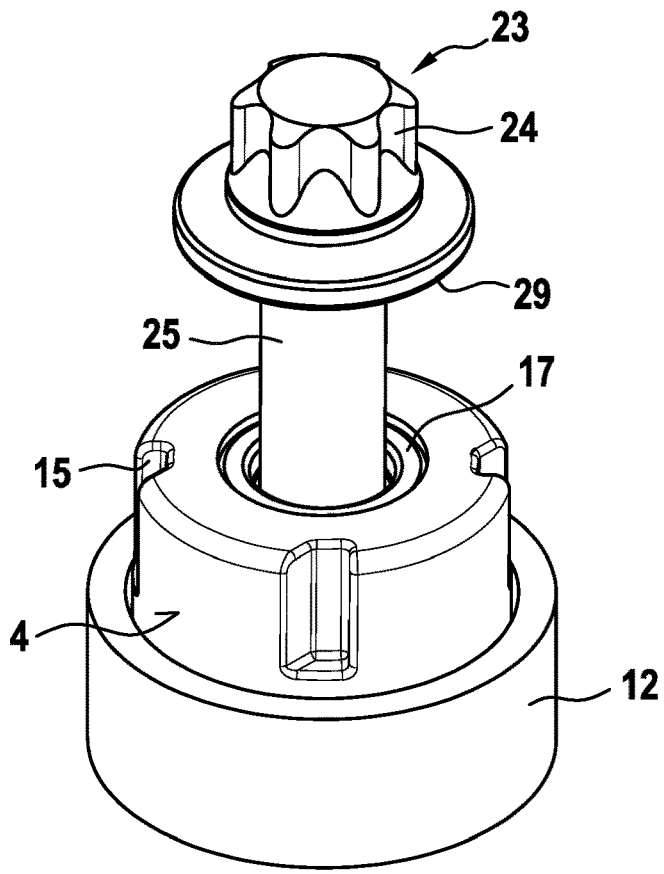
FIG. 2 shows a device according to the invention comprising damping element, first body, bush and fastening element in transport position in (a) perspective view and (b) cross-sectional view.
Figure 2B:
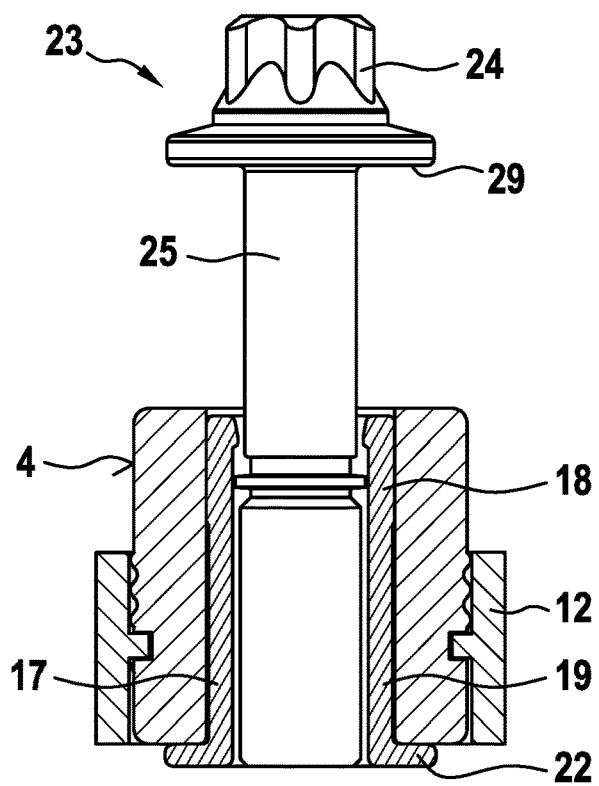

A screw 23 with a head 24 and a shank 25 engages as fastening element in the hole in the bush 17 and is preferably arranged captively in the bush 17. To this end, the bush 17 has an internal constriction 26 at the end pointing towards the second end face 3 of the damping element 1. The screw has an annular securing portion 27 on its shank 25, with a diameter which is of such a size that it cannot overcome the constriction 26 of the bush 17. The head 24 of the screw 23 also has a greater diameter than the constriction 26. Because the constriction 26 is located directly between head 24 and securing portion 27, the screw 23 is prevented from falling out of the damping element 1. The device comprising damping element 1, first body 12, bush 17 and captive screw 23 is shown in FIGS. 2a and 2b. The damping element 1 is secured in the recess 13 in the first body 12. The first body 12 with attached damping element 1 and screw 23 can be transported and delivered in this way for fitting to a second body (not shown), in particular an internal combustion engine.

Figure 3A:
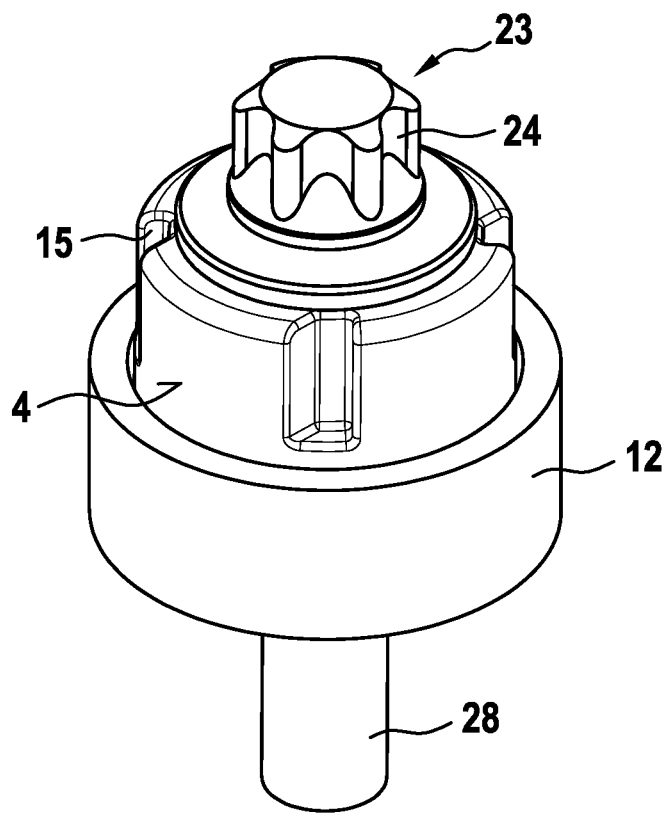
FIG. 3 shows a device according to the invention comprising damping element, first body, bush and fastening element in fastening position in (a) perspective view and (b) cross-sectional view.
Figure 3B:
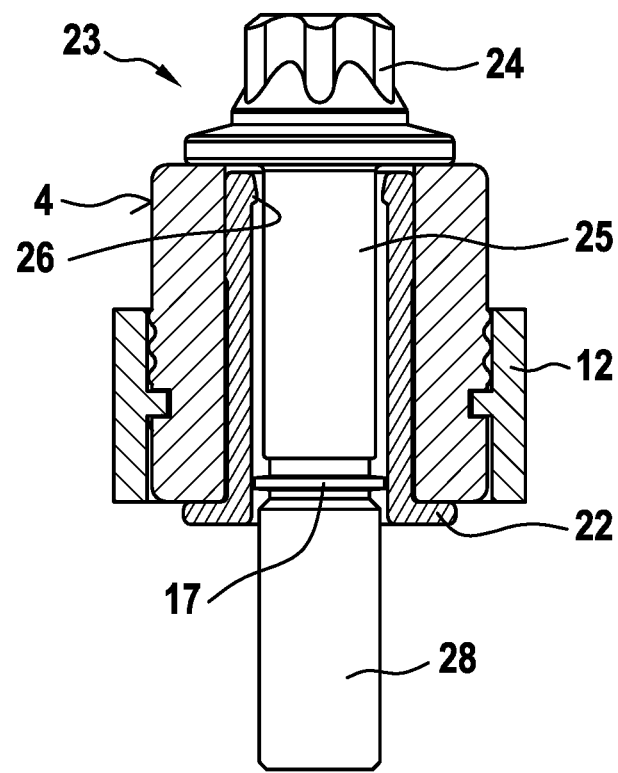
Figure 4A:
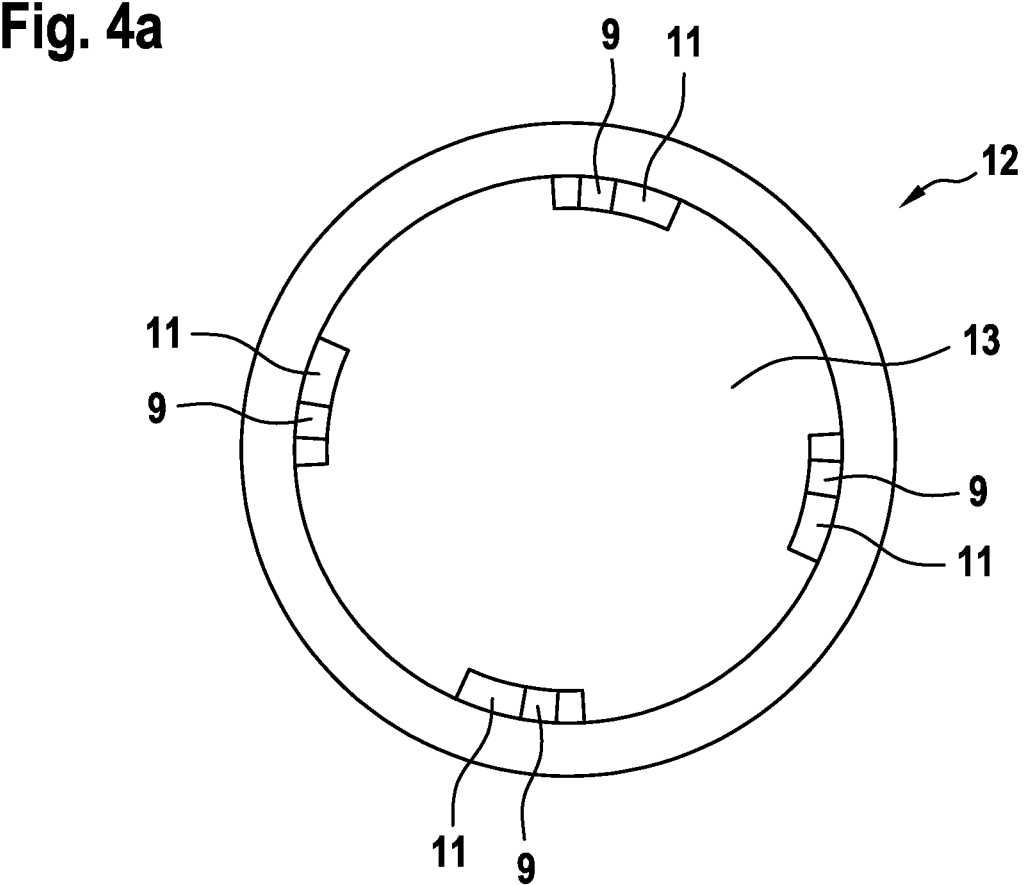
FIG. 4 shows the recess in the first body in (a) a first cross-sectional view perpendicular to the longitudinal direction of the recess and (b) along the section line A-A shown in (a)
Figure 4B:
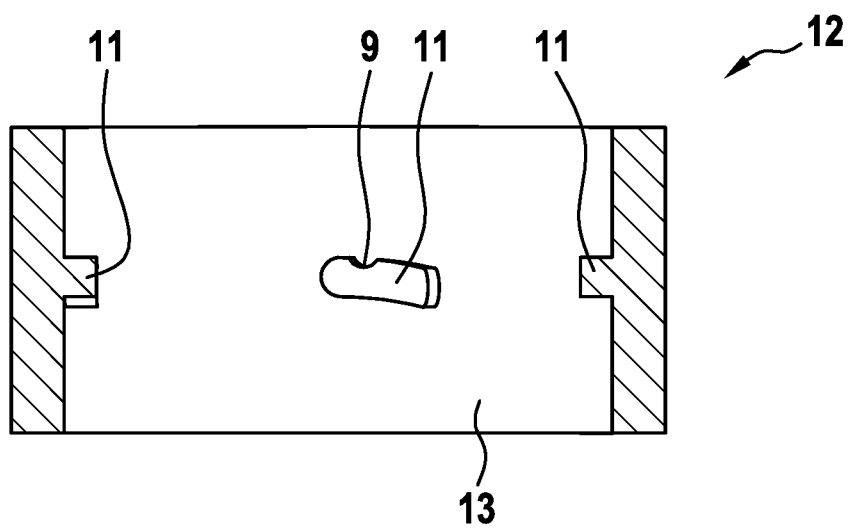

At its end remote from the head 24, on the other side of the securing portion, the shank 25 of the screw 23 has a thread 28, with which it can engage in a recess in the second body. The recess in the second body is a blind or through-hole and is provided for this purpose with a corresponding internal thread. The fastening position with screw 23 screwed into the recess in the second body is shown in FIGS. 3a and 3b. The head 24 of the screw 23 has a chin 29, the diameter of which is of a size such it can act on the second end face 3 of the damping element 1, in order to compress the damping element 1.

The features disclosed in the above description, the claims and the drawings may be of significance for implementation of the invention in its various embodiments either individually or in any desired combination.

The invention claimed is:

1. A combination, comprising:
 a damping element, and
 a first body, wherein the damping element engages in a recess of the first body,
 wherein the damping element has a threaded section on a circumferential surface,
 wherein the recess of the first body has, in a inner lateral surface, at least one mating thread section which corresponds to the threaded section of the damping element so that the damping element can be screwed to the first body by engagement with a thread in the at least one mating thread section,
 wherein the damping element has a latching element and wherein the first body has a mating latching element which selectively fixes the damping element to the first body in a state in which the damping element is screwed to the first body,
 wherein the damping element has a handling section in which a plurality of recesses or projections are arranged which are uniformly spaced in a circumferential direction on the side of the damping element.

2. The combination according to claim 1 wherein the at least one mating thread section has a multi-start thread.

3. The combination according to claim 1 wherein one or more of the latching element and the mating latching element is a projection, a cut out, or a constriction.

4. The combination according to claim 1 wherein the damping element is annular.

5. The combination according to claim 4 further comprising a sleeve arranged in a hole of the annular damping element.

6. The combination according to claim 5 wherein the sleeve is comprised of metal.

7. A device for the vibration-damped fastening of a first body to a second body, wherein the device has a combination, comprising:
 a damping element, and
 the first body, wherein the damping element engages in a recess of the first body, wherein the damping element has a threaded section on a circumferential surface, wherein the recess of the first body has, in an inner lateral surface, at least one mating thread section which corresponds to the threaded section of the damping element so that the damping element can be screwed to the first body by engagement with a thread in the at least one mating thread section, wherein the damping element has a latching element and wherein the first body has a mating latching element which selectively fixes the damping element to the first body in a state in which the damping element is screwed to the first body, wherein the damping element has a handling section in which a plurality of recesses or projections are arranged which are uniformly spaced in a circumferential direction on the side of the damping element.

8. The device according to claim 7, further comprising a fastening element which can engage in a hole of the damping element and a recess of the second body in order to connect them.

9. The device according to claim 8 wherein the fastening element is arranged in a captive manner in a sleeve.

10. The device according to claim 9 wherein the sleeve has a constriction at one end on an inner side.

11. The device according to claim 8 wherein the fastening element has a head having a chin, wherein a diameter of the head is greater than a diameter of the hole of the damping element.

12. The device according to claim 8 wherein the fastening element is a screw.

\* \* \* \* \*